(12) United States Patent
Oshima

(10) Patent No.: US 6,442,254 B1
(45) Date of Patent: Aug. 27, 2002

(54) IMAGE COMMUNICATION APPARATUS WITH EXCELLENT OPERABILITY TO ACHIEVE OPERATION FOR RECEIVING E-MAIL AT LOW COST

(75) Inventor: Makoto Oshima, Yokohama (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 09/558,865

(22) Filed: Apr. 27, 2000

(30) Foreign Application Priority Data

Sep. 3, 1999 (JP) ............................................. 11-250668

(51) Int. Cl.[7] .............................................. H04M 11/00
(52) U.S. Cl. ............................... 379/100.08; 379/93.24; 358/402
(58) Field of Search ....................... 379/100.08, 100.01, 379/100.06, 100.15, 100.16, 93.24; 358/402, 434, 442

(56) References Cited

U.S. PATENT DOCUMENTS 6,185,604 B1 * 2/2001 Sekiguchi .............. 379/100.08
6,337,900 B2 * 1/2002 Toyoda et al. ......... 379/100.08

* cited by examiner

*Primary Examiner*—Stella Woo
(74) *Attorney, Agent, or Firm*—Greenblum & Bernstein, P.L.C.

(57) ABSTRACT

An image communication apparatus of the present invention is provided with a reception section to receive an e-mail at predetermined intervals through a telephone line along with an automatic telephone answering function. In such an image communication apparatus, when the automatic telephone answering function is switched to valid, the e-mail reception operation is not performed. Thereby, when the automatic telephone answering function is valid because a user is out of home, the e-mail reception operation is not performed, reducing the cost accompanied by the e-mail reception operation. On the other hand, when the automatic telephone answering function is invalid, the e-mail reception operation is performed at predetermined intervals. Therefore it is possible to omit the e-mail reception instruction by a user, and to provide the image communication apparatus with excellent operability.

20 Claims, 6 Drawing Sheets

IMAGE COMMUNICATION APPARATUS WITH EXCELLENT OPERABILITY TO ACHIEVE OPERATION FOR RECEIVING E-MAIL AT LOW COST

BACKGROUND OF THE INVENTION

1. Field of the Invention

The present invention relates to an image communication apparatus, and more particularly, to an image communication apparatus with an e-mail communication function.

2. Description of the Related Art

A home telephone device and home facsimile device that can transmit and receive an e-mail have been recently developed. Such devices dial a provider to connect (dialup connection) when a user instructs to receive an e-mail, and checks for the presence or absence (existence) of an e-mail received in a mail-server provided by the provider. When the received e-mail exists, such devices receive the e-mail, and display it on a display or the like.

Thus such devices check for the existence of an e-mail when a user instructs to receive an e-mail. Therefore the user should instruct the reception of the e-mail when wants to check for the existence of the e-mail, and accordingly needs a complicated operation to check for the existence of the e-mail.

In order to improve the operability of such devices, it is considered to provide such devices with a function of performing a dialup connection to a provider periodically to check for the existence of an e-mail received in a mail server, i.e., auto-pilot function.

However, in the case where such an auto-pilot function is provided in, for example, a telephone, the telephone checks for the existence of the received e-mail periodically also when a user is out of home. Therefore there is the problem that the user should pay a connection charge for the dialup connection to the provider and a telephone charge for the reception of the e-mail despite the user being not capable of checking for the contents of the e-mail.

SUMMARY OF THE INVENTION

An object of the present invention is to provide an image communication apparatus capable of improving an operability of an operation for receiving an e-mail and of performing the operation at low cost.

The image communication apparatus of the present invention is provided with a reception section that receives an e-mail at predetermined intervals through telephone lines along with an automatic telephone answering function. In the case where the automatic telephone answering function is switched to valid by a button that switches the automatic telephone answering function to valid or invalid, the reception section is configured not to perform reception operation of an e-mail. In the case where the automatic telephone answering function is switched to valid by the button that switches the automatic telephone answering function to valid or invalid, the reception operation of the e-mail at predetermined intervals is not performed in the reception section. Therefore it is possible to reduce the cost required for the reception operation in the reception section. On the other hand, in the case where the automatic telephone answering function is switched to invalid, since the reception section can perform the reception operation at predetermined intervals, an user does not need to instruct to receive the e-mail one by one. Therefore it is possible to simplify the operation of the user required for the reception operation of the e-mail.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

An embodiment of the present invention will be described below with reference to accompanying drawings.

Figure 1:
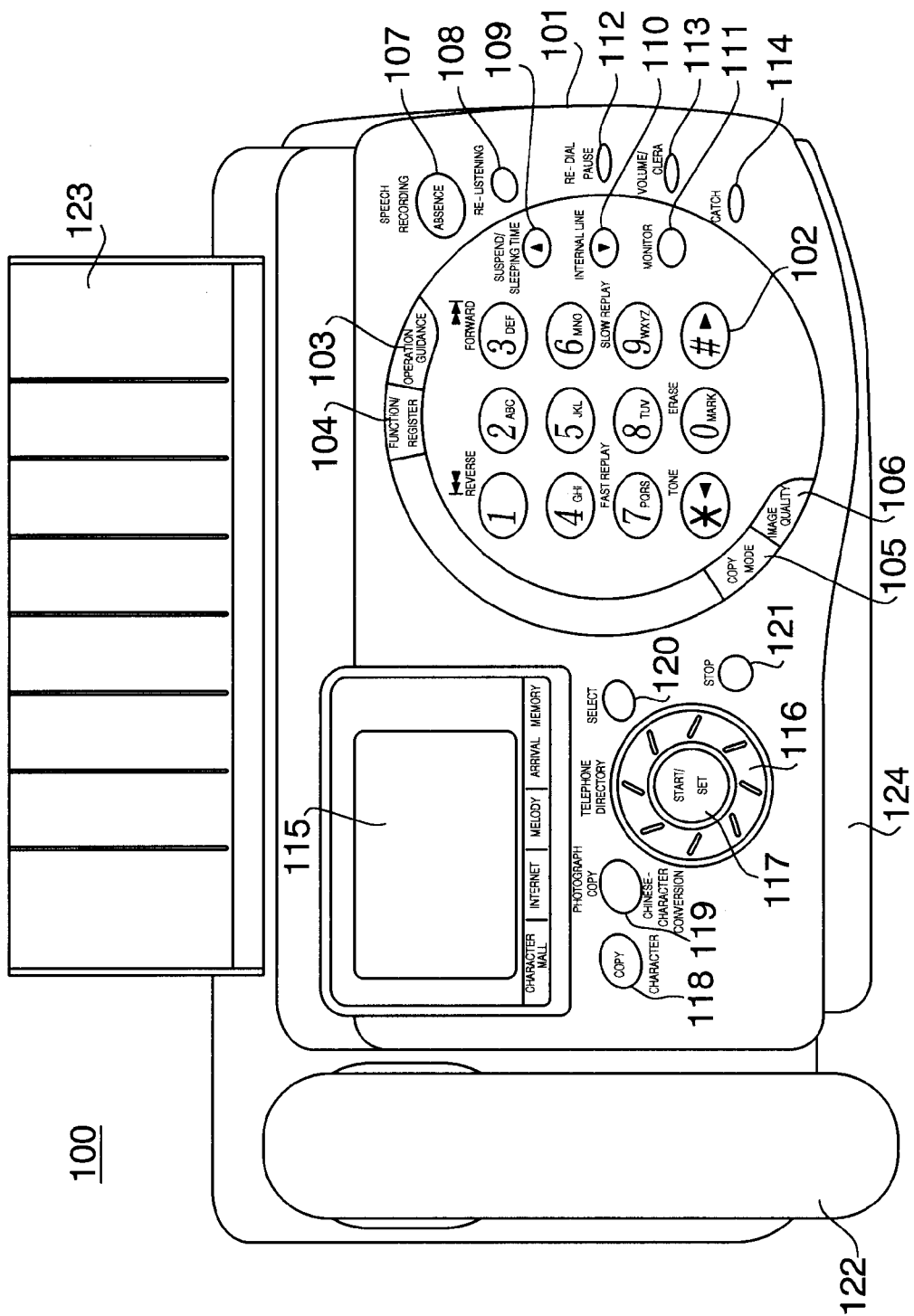
FIG. 1 is a top view illustrating an appearance of an image communication apparatus according to one embodiment of the present invention.

FIG. 1 is a top view illustrating an appearance of an image communication according to one embodiment of the present invention. In FIG. 1, it is assumed that a lower portion of the figure is a front surface of image communication apparatus 100, and that an upper portion of the figure is a rear surface of image communication apparatus 100.

As illustrated in FIG. 1, image communication apparatus 100 is provided with panel 101 on a top surface thereof. Dial keys 102 are provided at a right hand side from a center on panel 101 as viewed in FIG. 1. Dial keys 102 are used in inputting a telephone number and facsimile number (hereinafter FAX number), and also used in reproducing a recorded message in an automatic telephone answering function and in making up a message in an e-mail function.

Operation guidance button 103, function/register button 104, copy mode button 105 and image quality button 106 are provided in the vicinity of dial keys 102. Operation guidance button 103 is used in displaying guidance of the operation of image communication apparatus 100 on a display described later. Function/register button 104 is used in selecting functions provided in image communication apparatus 100. For example, the button 104 is used to set the function of checking for an e-mail in a provider periodically, i.e., auto-pilot function in image communication apparatus 100. Copy mode button 105 is used in selecting whether to enlarge or reduce an image in the copy mode when image communication apparatus 100 is used as a copy machine. Image quality button 106 is used in selecting an image quality at the time of fax reception or copy in image communication apparatus 100.

Automatic telephone answering button 107 is provided at a right hand side from dial keys 102 as viewed in FIG. 1. Automatic telephone answering button 107 is used in switching the automatic telephone answering function of image communication apparatus 100 to "ON" or "OFF". Automatic telephone answering button 107 is usually used when an operator is out of home. When the automatic telephone answering function of image communication apparatus 100 is turned on with automatic telephone answering button 107, a received message is recorded. Thereafter, when the automatic telephone answering function of image communication apparatus 100 is turned off with automatic telephone answering button 107, the recorded message is automatically reproduced. In addition, when the button 107 is pressed during a call, a conversation during the call is recorded.

Re-listening button 108 is provided at a portion in front of automatic telephone answering button 107. Re-listening button 108 is used in re-listening to a message automatically reproduced when automatic telephone answering function button 107 is turned off.

Suspend/sleeping time button 109 is further provided at the portion in front of automatic telephone answering button 107. Suspend/sleeping time button 109 is used in suspending a conversation during a call. Further suspend/sleeping time button 109 is used in setting image communication apparatus 100 not to sound, and for example, used when a user goes to sleep. This function of setting image communication apparatus 100 not to sound at the time of receiving a call is called sleeping time function.

Internal line button 110, monitor button 111, redial/pose dial button 112, volume/clear button 113 and catch button 114 are provided at a portion in front of re-listening button 108 and suspend/sleeping time button 109. Internal line button 110 is used in forwarding a call to an extension set at the time of using the extension set in image communication apparatus 100. Monitor button 111 is used in outputting, for example, a conversation in image communication apparatus 100, from a speaker. Redial/pose button 112 is used in calling again the other party immediately after calling the same party. Redial/pose button 112 is further used in suspending reproduction of a recorded message. Volume/clear button 113 is used in adjusting a volume of received speech during a call, and in adjusting a sound volume made at the time of receiving a call. Volume/clear button 113 is further used in clearing, for example, a recorded message. Catch button 114 is used in, when a call is placed from the other party during a call with another party, suspending the call with a current party and talking to a new party.

Meanwhile display 115 is provided at a left hand side from a center on panel 101 as viewed in FIG. 1. Display 115 is comprised of LCD and others. Display 115 displays a screen with items corresponding to a state of image communication apparatus 100. For example, when a telephone number is input to image communication apparatus 100, the input telephone number is displayed on display 115. When a user checks for the contents of an e-mail, the received e-mail is displayed on display 115. Display 115 is provided, at a front side thereof, with columns to display a currently selected function that is provided in image communication apparatus 100. Specifically provided are columns respectively to display a character mail, FAX for a foreign country using the internet networks, arrival melody downloading and arrival call history.

Telephone directory dial 116 is provided at a portion in front of display 115. Telephone directory 116 is used in selecting a telephone number or FAX number of the other party registered by a user in image communication apparatus 100. Telephone or FAX numbers displayed on display 115 are scrolled by rotating telephone directory dial 116. Telephone directory dial 116 is also used in scrolling a display such as function selection screen that is described later.

Start/set button 117 is provided at a center of telephone directory dial 116. Start/set button 117 is used in, for example, starting FAX transmission in image communication apparatus 100.

Copy button 118 and photograph copy button 119 are provided at a left hand side from telephone directory dial 116 as viewed in FIG. 1. Copy button 118 is used in starting a copy at the time of using a copy function of image communication apparatus 100. Copy button 118 is also used in switching the function of dial keys 102 at the time of making up an e-mail in an e-mail communication function of image communication apparatus 100. Photograph copy button 119 is used in copying an image requiring a high image quality such as a photograph. Photograph copy button 119 is further used in performing Chinese-character conversion of an input character at the time of making up an e-mail in the e-mail communication function of image communication apparatus 100.

Select button 120 is provided at a right hand side from telephone directory dial 116 as viewed in FIG. 1. Select button 120 is used in selecting the function such as character mail displayed on display 115 as described above.

Stop button 121 is provided at a right hand side form telephone directory dial 116. Stop button 121 is used in stopping, for example, already started FAX transmission in image communication apparatus 100.

Handset 122 is attached to an end portion on the top surface of image communication apparatus 100. Paper feed tray 123 is provided at a rear portion on the top surface of image communication apparatus 100. Hand scanner 124 is further provided at a front side surface of image communication apparatus 100.

Figure 2:
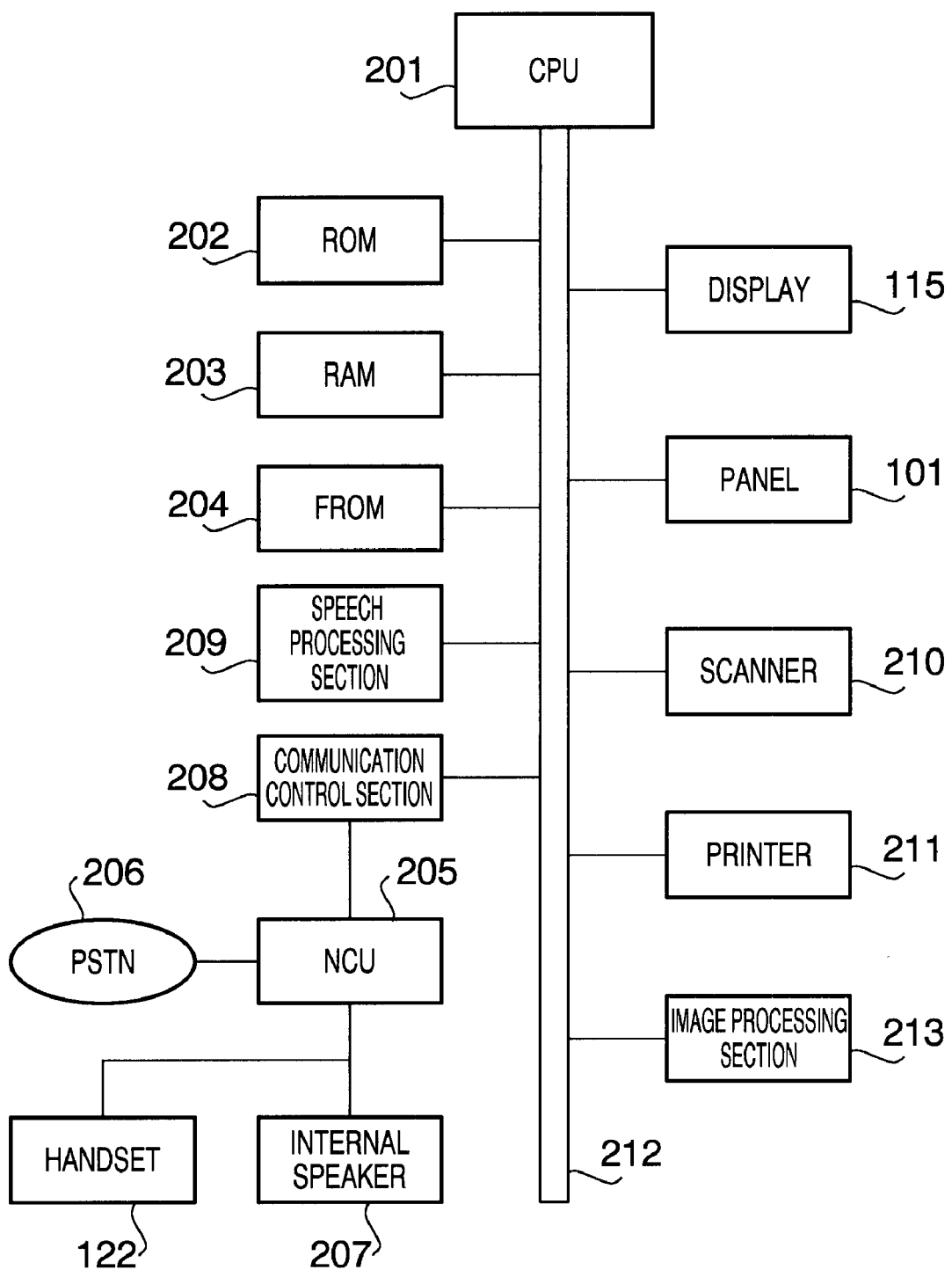
FIG. 2 is a hardware block diagram of the image communication apparatus according to the above embodiment.

FIG. 2 is a hardware block diagram of image communication apparatus 100 according to the above embodiment.

CPU (Central Processing Unit) 201 executes target processing according to a program. ROM (Read Only Memory) 202 is a memory dedicated to the read only which stores a basic program such as a start program. RAM (Random Access Memory) 203 is a main memory from which CPU 201 reads the program and data to execute. Flash memory (hereinafter referred to as FROM) 204 is a nonvolatile semiconductor memory enabling erasing and rewriting, and stores mainly an execution program such as an application program and data.

Network control section (hereinafter referred to as NCU) 205 controls transmission and reception of a signal communicated with Public Switched Telephone Networks (hereinafter abbreviated as PSTN) 206. NCU 205 performs processing such as placing or receiving a call. NCU 205 is connected to handset 122 and internal speaker 207.

Communication control section 208 performs a data communication and facsimile communication through PSTN 207. Specific examples of communication control section 208 are a modem, DSU and terminal adapter (TA). Those devices also convert speech signals into digital signals.

Speech processing section 209 performs coding of digital speech signals to compress, while performing decoding of compressed speech signals to decompress.

Scanner 210 performs scanning of an original. Printer 211 prints various data such as an image and text data. Bus 212 is a path to connect CPU 201 to each section such as ROM 202 and RAM 203.

Image processing section 213 performs coding of image data scanned with scanner 210 to compress, while performing decoding of compressed image data received through PSTN 206 to decompress.

Figure 3:
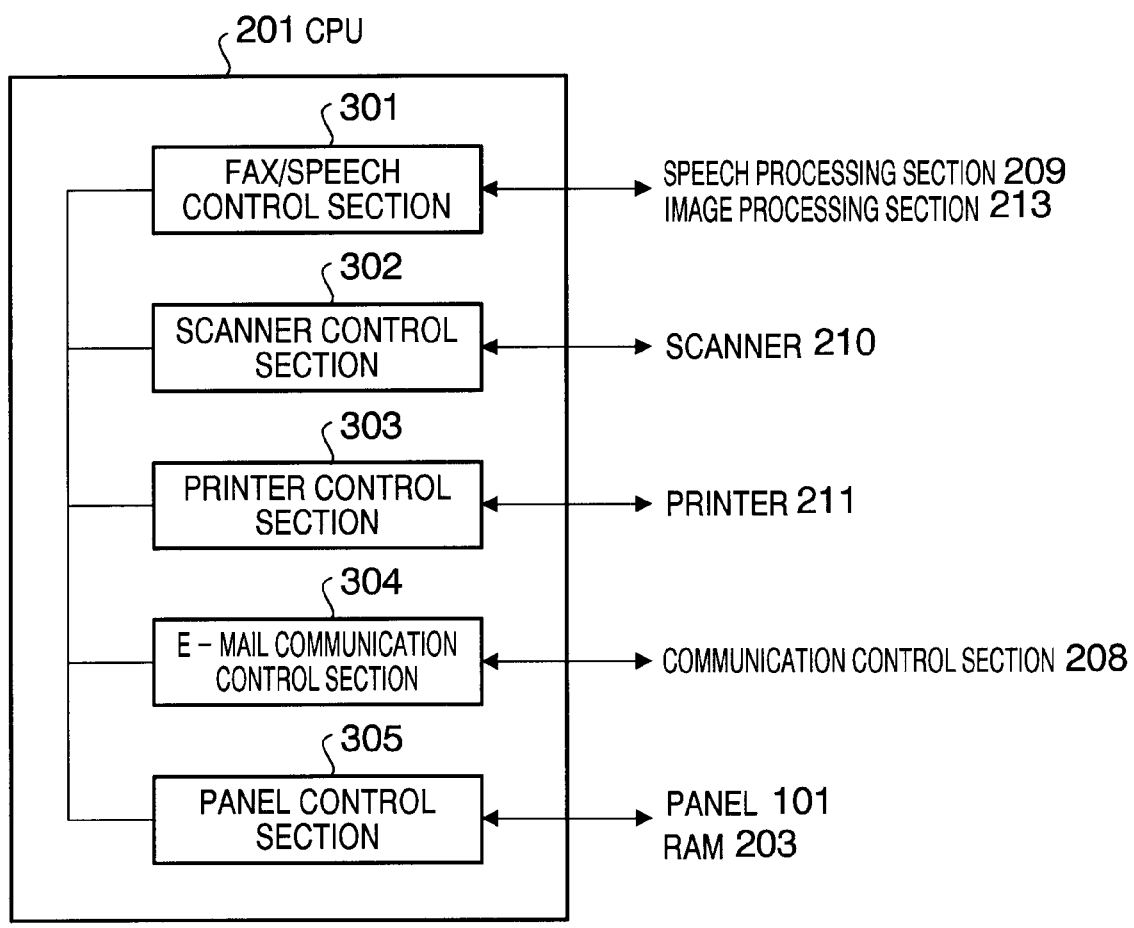
FIG. 3 is a function block diagram illustrating the image communication apparatus according to the above embodiment.

ROM 202 stores the program, which CPU 201 executes. The functions achieved thereby are explained below. FIG. 3 is a block diagram illustrating the functions of image communication apparatus 100.

Image communication apparatus 100 is provided with FAX speech control section 301, scanner control section 302 and printer control section 303, which respectively control speech processing section 209 and image processing section 213, scanner 210, and printer 211.

Image communication apparatus 100 is further provided with e-mail communication control section 304 as a function to achieve the e-mail communication function. Image communication apparatus 100 is furthermore provided with panel control section 305 that controls an input from panel 115.

Figure 4:
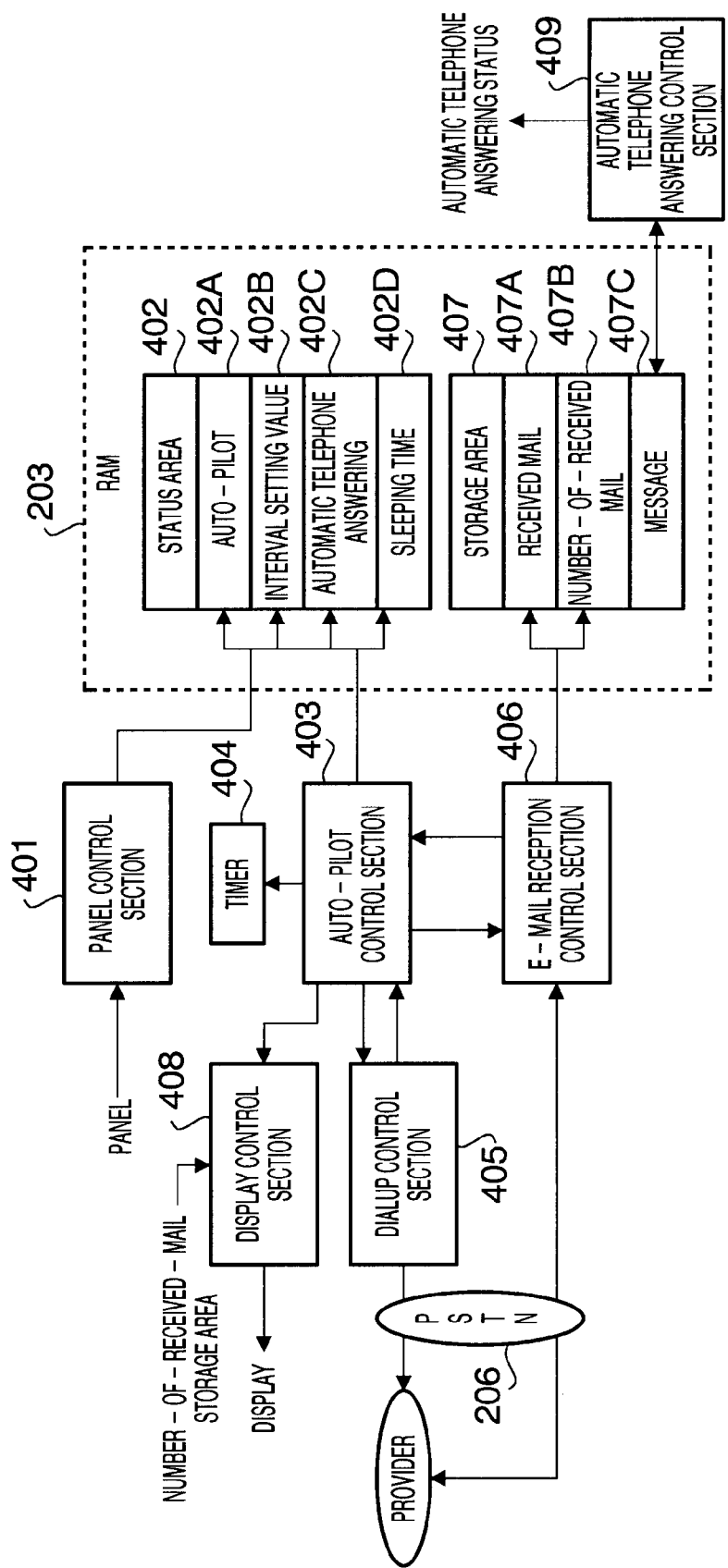
FIG. 4 is a function block diagram of an e-mail communication control section of the image communication apparatus according to the above embodiment.

FIG. 4 is a functional block diagram illustrating e-mail communication control section 304 of image communication apparatus 100 according to the above embodiment.

Panel control section 401 sets a flag on various statuses of status area 401 of RAM 203. Status area 402 is provided with auto-pilot status 402A, interval setting value status 402B, automatic telephone answering status 402C, and sleeping time function status 402D.

Auto-pilot status 402A is to switch the auto-pilot function of image communication apparatus 100 to "ON" or "OFF". Panel control section 401 sets a flag on auto-pilot status 402A, and thereby the auto-pilot function of image communication apparatus 100 is turned on.

Interval setting value status 402B is to switch intervals at which the auto-pilot function works when the auto-pilot function is turned on in image communication apparatus 100. For example, it is set for the auto-pilot function to work every 3, 6, 12, 24, or 48 hour s. In addition, it may be possible to set an arbitrary time other than the above-mentioned times on interval setting value status 402B. Panel control section 401 sets a flag indicative of either of times on interval setting value status 402B, and thereby the auto-pilot function is made to work every predetermined hours that a user selects.

Automatic telephone answering status 402C is to switch the automatic telephone answering function of image communication apparatus 100 to "ON" or "OFF". Panel control section 401 sets a flag on automatic telephone answering status 402C, and thereby the automatic telephone answering function of image communication apparatus 100 is turned on.

Sleeping time function status 402D is to switch the sleeping time function of image communication apparatus 100 to "ON" or "OFF". Panel control section 401 sets a flag on sleeping time function status 402D, and thereby the sleeping time function of image communication apparatus 100 is turned on.

Auto-pilot control section 403 determines the flag of status area 402, and executes various control.

For example, auto-pilot control section 403 determines whether the flag is set on auto-pilot status 402A. When the flag is set, auto-pilot control section 403 executes the auto-pilot function.

Specifically auto-pilot control section 403 determines the flag of interval setting value status 402B, and judges a value indicative of intervals at which the auto-pilot function is executed. Then auto-pilot control section 403 compares a count value in timer 404 with the interval setting value of interval setting value status 402B, and when the two values match, executes the auto-pilot function.

Auto-pilot control section 403 further determines whether the flag is set on automatic telephone answering status 402C. When the flag is set, auto-pilot control section 403 does not execute the auto-pilot function even in the case where it comes to the time selected by the flag of interval setting value status 402B. In other words, when the flag is set on automatic telephone answering status 402C, it is expected that checking for the existence of an e-mail is not required because the user is out of home. Therefore auto-pilot control section 403 does not execute the auto-pilot function.

Auto-pilot control section 403 furthermore determines whether the flag is set on sleeping time function status 402D. When the flag is set, auto-pilot control section 403 does not execute the auto-pilot function even in the case where it comes to the time selected by the flag of interval setting value status 402B. Similarly to the case where the flag is set on automatic telephone answering status 402C, it is expected that checking for the existence of an e-mail is not required because the user is sleeping.

Thus auto-pilot control section 403 determines whether the flag is set on automatic telephone answering status 402C, or sleeping time function status 402D, and when the set flag is unset, executes the auto-pilot function. In other words, when the set flag is unset on automatic telephone answering status 402C, or sleeping time function status 402D, it is expected that checking for the existence of an e-mail is required because the user gets home or gets up. Therefore auto-pilot control section 403 executes the auto-pilot function.

Dialup control section 405 performs dialup connection to a provider through PSTN 206 based on an instruction from auto-pilot control section 403. When the dialup connection is performed normally, and a communication channel is established, dialup control section 405 notifies auto-pilot control section 403 of the established communication channel.

E-mail reception control section 406 checks for the existence of an e-mail received in a mail server provided by the provider through PSTN 206, and then notifies auto-pilot control section 403 of the existence (presence of absence) of the e-mail.

When the received e-mail exists in the mail server, e-mail reception control section 406 receives the email, and stores the received e-mail(s) and the number of the e-mail(s) in storage area 407 of RAM 203. Specifically e-mail reception control section 406 stores the received e-mail(s) and the number of the e-mail(s) respectively in received mail storage area 407A and number-of-received-mail storage area 407B of storage area 407.

Based on an instruction from auto-pilot control section 403, display control section 408 displays the existence (presence or absence) of a received e-mail, and further the number of the received e-mail(s) when the received e-mail (s) exists. At this point, display control section 408 judges number-of-received-mail storage area 407B of RAM 203, and thereby displays the number of the received e-mail(s) on display 115.

Automatic telephone answering control section 409 controls the automatic telephone answering function of image communication apparatus 100. Specifically automatic telephone answering control section 409 determines whether a flag is set on automatic telephone answering status 402C. When the flag is set, automatic telephone answering control section 409 performs the automatic telephone answering function. Specifically automatic telephone answering control section 409 records a message received during a period when the automatic telephone answering function is performed, and stores the recorded message in message storage area 407C of storage area 407. Thus automatic telephone answering control section 409 determines whether the flag is set on automatic telephone answering status 402, and when the set flag is unset, cancels the automatic telephone answering function, and concurrently reproduces the message stored in message storage area 403C.

Figure 5:
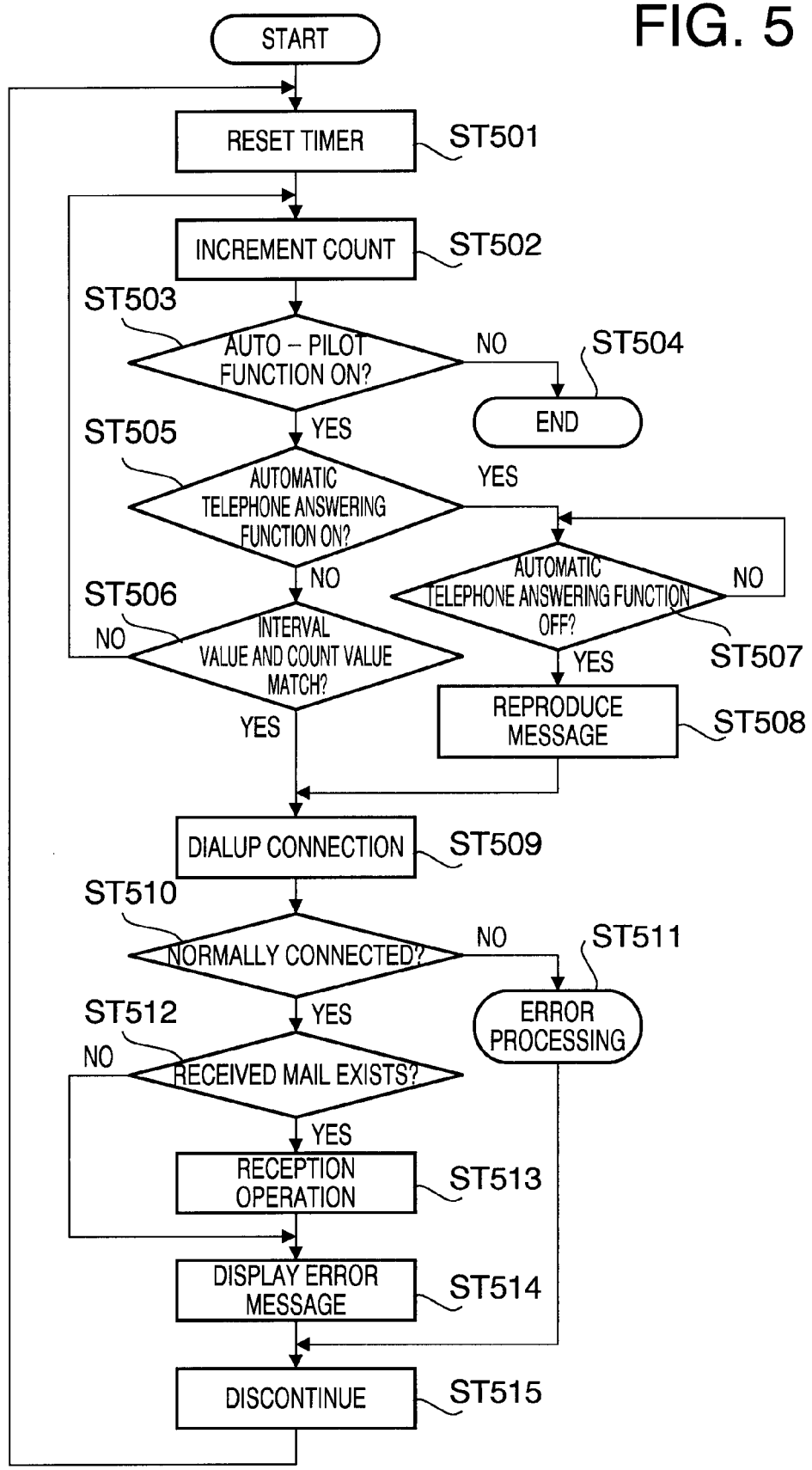
FIG. 5 is flow diagram illustrating e-mail reception operation when an auto-pilot function is set in the image communication apparatus according to the above embodiment.

The following description explains the e-mail reception operation when the auto-pilot function is set in image communication apparatus 100 with the above-mentioned configuration. FIG. 5 is a flow diagram illustrating the e-mail reception operation when the auto-pilot function is set in image communication apparatus 100.

In image communication apparatus 100, to set the auto-pilot function, a user first presses function/register button 104. Thereby, a function selection screen is displayed on display 115. When the function selection screen is displayed, the user rotates telephone directory dial 116, and thereby selects an auto-pilot setting screen. On the auto-pilot setting screen, the user can select "ON" or "OFF" of the auto-pilot function. At this point, when the user selects "ON" of the auto-pilot function, based on the input instruction, panel control section 401 sets a flag on auto-pilot status 402A.

When the user switches the auto-pilot function to "ON", an interval setting value screen for the auto-pilot function is displayed on display 115. The user can select an interval setting value for the auto-pilot function to perform. At this point, when the user selects the interval setting value for the auto-pilot function, based on the input value, panel control section 401 sets a flag indicative of the selected value on interval setting value status 402B. Thereby the auto-pilot function is set in image communication apparatus 100. It is assumed herein that the auto-pilot function is set, and an interval of three hours is set as interval setting value.

When the auto-pilot function is set in image communication apparatus 100, auto-pilot control section 403 resets a count value in timer 404 (ST501). Then auto-pilot control section 403 increments the count value in timer 404 (ST502). Thus, when the auto-pilot function is set, the count value is once reset, and then incremented. Therefore the auto-pilot function is performed according to the interval setting value selected by the user.

Auto-pilot control section 403 next determines whether a flag is set on auto-pilot status 402A. Thereby auto-pilot control section 403 determines whether or not the auto-pilot function is canceled (ST503). At this point, when the flag is not set on auto-pilot status 402A, auto-pilot control section 403 determines that the auto-pilot function is canceled. Therefore, in image communication apparatus 100, the auto-pilot function is not performed (ST504). Accordingly image communication apparatus 100 performs the e-mail reception operation when the user instructs to receive the e-mail.

On the other hand, when the flag is set on auto-pilot status 402A, auto-pilot control section 403 determines whether a flag is set on automatic telephone answering status 402C. Thereby, auto-pilot control section 403 determines whether or not the automatic telephone answering function is set (ST505). At this point, when the flag is not set on automatic telephone answering status 402C, auto-pilot control section 403 compares an interval setting value corresponding to the flag on interval setting value status 402B with the count value in timer 404, and determines whether the interval setting value and the count value match (ST506). In this case, since the interval setting value is set as three hours, auto-pilot control section 403 determines whether or not the count value in timer 404 is indicative of three hours.

When the interval setting value and the count value do not match, auto-pilot control section 403 returns the next processing to ST502. Then the processing of ST502 to ST506 is repeated until the interval setting value and the count value match.

Then, when the interval setting value and the count value match, auto-pilot control section 403 instructs dialup control section 405 to perform the dialup connection to a provider. Based on this instruction, dialup control section 405 performs the dialup connection to the provider through PSTN 206 (ST509). When the dialup connection is performed normally, and a communication channel is established, dialup control section 405 notifies auto-pilot control section 403 of the established communication channel.

Based on the notification, auto-pilot control section 403 determines whether or not the communication channel is normally established (ST510). At this point, when the communication channel is not normally established, auto-pilot control section 403 instructs display control section 408 to display an error message. Based on this instruction, display control section 408 displays the error message stored in an area not shown in the figure in RAM 203 (ST511).

When the error message is displayed, auto-pilot control section 403 instructs dialup control section 405 to discontinue the communication channel. Based on this instruction, dialup control section 405 discontinues the communication channel (ST515).

On the other hand, when the communication channel is normally established, auto-pilot control section 403 instructs e-mail reception control section 406 to check for the existence of an e-mail received in a mail server provided by the provider. Based on this instruction, e-mail reception control section 406 inquires the existence of the received e-mail of the mail server. Then e-mail reception control section 406 receives a reply from the mail server, and notifies the result to auto-pilot control section 403.

Based on this notification, auto-pilot control section 403 determines whether the received e-mail exists in the mail server (ST512). At this point, when the received e-mail exists in the mail server, auto-pilot control section 403 instructs e-mail reception control section 406 to receive the e-mail. Based on this instruction, e-mail reception control section 406 receives the e-mail (ST513). E-mail reception control section 406 stores the received e-mail(s) and the number of the received e-mail(s) respectively in received mail storage area 407A and number-of-received-mail storage area 407B.

In the case of receiving an e-mail at ST513, or in the case of determining that the received e-mail does not exist in the mail server at ST512, auto-pilot control section 403 instructs display control section 408 to display the existence (presence or absence) of the received e-mail. Based on this instruction, display control section 408 displays a message indicative of the presence or absence of the received e-mail on display 115. At this point, when the received e-mail exists, display control section 408 checks for the number of e-mail(s) stored in number-of-received-mail storage area 407B, and displays the number of the received e-mail(s) on display 115.

When the presence or absence of the received e-mail and others are displayed on display 115, auto-pilot control section 403 instructs dialup control section 405 to discontinue the established communication channel. Based on this instruction, dialup control section 405 discontinues the established communication channel (ST515).

Thus in image communication apparatus 100, a series of operations of receiving an e-mail when the auto-pilot function is set are performed. Then auto-pilot control section 403 returns the next processing to ST501, and the processing of ST501 to ST515 is repeated.

On the other hand, in the case where it is determined at ST505 that the flag is set on automatic telephone answering status 402C, auto-pilot control section 403 determines whether the set flag is unset on automatic telephone answering status 402C (ST507). Thereby, auto-pilot control section 403 determines whether or not the automatic telephone answering function is canceled.

Thus when the flag is set on automatic telephone answering status 402C, automatic telephone answering control section 409 repeats the processing of ST507 until the set flag is unset on automatic telephone answering status 402C, whereby the shift to the other processing is prevented in image communication apparatus 100. Then when the set flag is unset on automatic telephone answering status 402C, automatic telephone answering control section 409 determines whether a stored message exits in message storage area 407C. When the message received during the automatic telephone answering period exists, automatic telephone answering section 409 reproduces the message, and when such a message does not exist, the section 409 notifies the absence of the message to the user (ST508).

When auto-pilot control section 403 detects that the automatic telephone answering function is canceled at ST507, and automatic telephone answering control section 409 reproduces the message at ST508, auto-pilot control section 403 instructs dialup control section 405 to perform the dialup connection to the provider. Based on this instruction, dialup control section 405 performs the dialup connection to the provider through PSTN 206 (ST509). Thereafter auto-pilot control section 403 performs the processing of ST510 to ST515. Thus when the flag is set on automatic telephone answering status 402C, auto-pilot control section 403 does not perform the e-mail reception operation until the set flag is unset on automatic telephone answering status 402C. In other words, auto-pilot control section 403 postpones the e-mail reception operation, while determining whether automatic telephone answering status 402C is flagged.

As described above, in image communication apparatus 100, when the auto-pilot function is set, it is determined whether or not the automatic telephone answering function is set. Then, when the automatic telephone answering function is set, the auto-pilot function is not performed even in the case where it comes to the time corresponding to the interval setting value selected in the auto-pilot function. Accordingly it is possible to reduce the costs of communication charge and connection change accompanied by the execution of the auto-pilot function.

Figure 6:
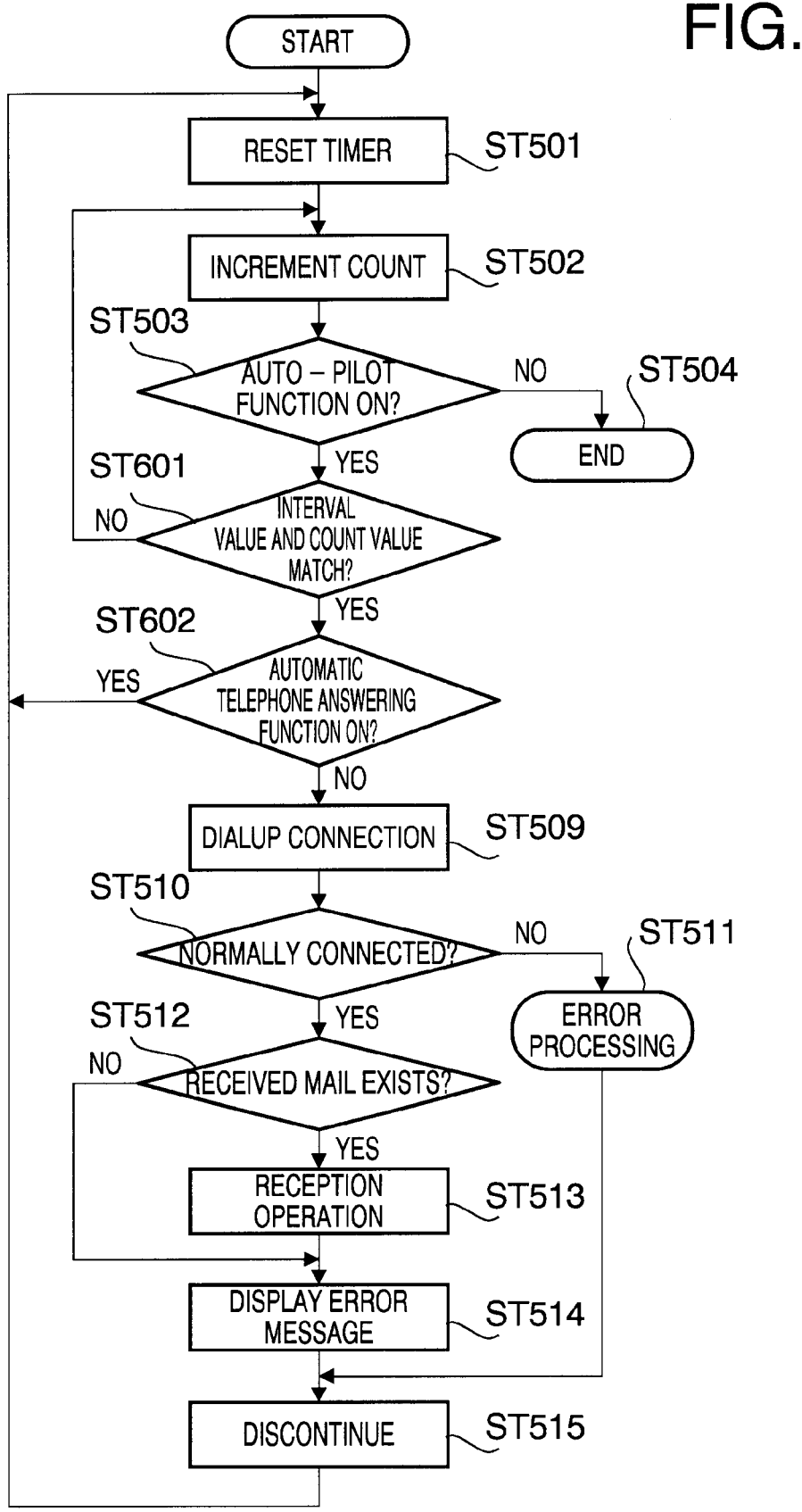
FIG. 6 is another flow diagram illustrating the e-mail reception operation when the auto-pilot function is set in the image communication apparatus according to the above embodiment.

In addition, after determining whether the automatic telephone answering function is set at AT505, image communication apparatus 100 determines whether the interval setting value in the auto-pilot function and the count value in timer 404 match, and when the two values match, performs the dialup connection. However, as illustrated in FIG. 6, it may be possible to determine whether the interval setting value in the auto-pilot function and the count value in timer 404 match at ST601, further determine whether the automatic telephone answering function is set when the two values match, and when the automatic telephone answering function is set, return the processing to ST501 to start counting in timer 404 again.

In the thus changed case, it is possible to omit the e-mail reception operation set to be performed at set intervals when the automatic telephone answering telephone function is set in the case where the interval setting value and the count value match. Further, since the e-mail reception operation is performed according to the interval setting value in the auto-pilot function, despite the automatic telephone answering function being set or canceled, the e-mail reception operation is always performed based on the original interval setting value selected by a user.

Thus, the e-mail reception operation is performed according to the interval setting value in the auto-pilot function while being omitted when the automatic telephone answering function is set, in other words, the e-mail reception operation is always performed at intervals originally set by a user except the period when the automatic telephone answering function is set, in which the e-mail reception operation is omitted. Accordingly when the user selects the interval setting value to receive an e-mail at a desired time, it is possible to receive the e-mail at the desired time without changing the desired time.

Thus, according to image communication apparatus 100 of this embodiment, by enabling the auto-pilot function to be set, the dialup connection is periodically performed to a provider to receive an e-mail. Therefore, it is not necessary for a user to instruct to receive an e-mail each time. Accordingly it is possible to improve the operability of the e-mail reception operation performed in image communication apparatus 100.

Further according to image communication apparatus 100, it is determined whether the automatic telephone answering function is set by determining whether automatic telephone answering status 402C is flagged. Then, when the automatic telephone answering function is set, the e-mail reception operation is not performed even when it comes to the time corresponding to the interval setting value selected in the auto-pilot function. Therefore, it is possible to prevent a user from paying the communication charge and connection charge required for the e-mail reception operation performed despite that a user cannot check for the contents of the e-mail because of, for example, the user is out of home. It is thereby possible to perform the e-mail reception operation at low cost.

In addition, this embodiment explains about the image communication apparatus that determines whether the automatic telephone answering function is set by determining whether automatic telephone answering status 402C is flagged, and thereby determines whether to perform the auto-pilot function. However, it may be possible to determine whether the sleeping time function is set by determining whether sleeping time status 402D is flagged, instead of automatic telephone answering status 402C, and thereby determine whether to perform the auto-pilot function. Sleeping time status 402D is flagged as well as automatic telephone answering status 402C when it is not necessary to receive an e-mail, whereby the same effect as this embodiment can be obtained.

Further in this embodiment, e-mails are received periodically by selecting the interval setting value in the auto-pilot function. However it may be possible to change the above setting to perform the e-mail reception at the predetermined time without receiving e-mails periodically. In the thus changed case, it is possible to perform the e-mail reception operation at the time required by a user.

Furthermore this embodiment explains about the image communication apparatus that performs the dialup connection to a provider periodically to perform the e-mail reception operation by enabling the auto-pilot function, and does not perform the e-mail reception operation when it comes to the time corresponding to the interval setting value when the automatic telephone answering function is set in the case where the auto-pilot function is set. However, the present invention is not limited to such an image communication apparatus, and applicable to other apparatuses such as a telephone.

As described above, according to the present invention, in the case where the auto-pilot function is set, the image communication apparatus is set to perform the e-mail reception operation periodically when the automatic telephone answering function is not set, while not performing the e-mail reception operation when the automatic telephone answering function is set, whereby it is possible to improve the operability of the e-mail reception operation and to perform the e-mail reception operation at low cost.

The present invention is not limited to the above described embodiments, and various variations and modifications may be possible without departing from the scope of the present invention.

This application is based on the Japanese Patent Application No.HEI11-250668 filed on Sep. 3, 1999, entire content of which is expressly incorporated by reference herein.

What is claimed is:

1. An image communication apparatus with an automatic telephone answering function, comprising:
   a reception section that is configured to receive an e-mail through a communication channel; and
   a control section that is configured to instruct said reception section to receive the e-mail at predetermined intervals, while judging whether or not said automatic answering telephone function is valid before instructing to receive the e-mail, and not to instruct to receive the e-mail when said answering telephone function is valid.

2. The image communication apparatus according to claim 1, wherein said control section instructs said reception section to receive the e-mail when said automatic telephone answering function is switched from valid to invalid.

3. The image communication apparatus according to claim 2, wherein said control section instructs said reception section not to receive the e-mail during the time said automatic telephone answering function is valid, and after the time said automatic telephone answering function is switched to invalid, instructs said reception section to receive the e-mail at predetermined intervals.

4. The image communication apparatus according to claim 1, wherein said control section controls reception of the e-mail in said reception section, while keeping said predetermined intervals even when said automatic telephone answering function is switched.

5. The image communication apparatus according to claim 4, wherein said control section instructs said reception section to omit the reception of the e-mail during the time said automatic telephone answering function is valid.

6. The image communication apparatus according to claim 1, where in said control section judges whether or not said e-mail to be received exists before instructing said reception section to receive said e-mail, and when said e-mail exists, instructs said reception section to receive said e-mail.

7. The image communication apparatus according to claim 6, wherein said control section judges whether or not said e-mail to be received exists by inquiring whether said e-mail is received in a mail server of said mail server through said communication channel.

8. The image communication apparatus according to claim 1, wherein said control section is capable of arbitrarily setting an interval to instruct said reception section to receive said e-mail.

9. An image communication apparatus with a sound function of sounding according to arrival of a call, comprising:
   a reception section that is configured to receive an e-mail through a communication channel; and
   a control section that is configured to instruct said reception section to receive the e-mail at predetermined intervals, while judging whether or not said sound function is invalid before instructing to receive the e-mail, and not to instruct to receive the e-mail when said sound function is invalid.

10. The image communication apparatus according to claim 9, wherein said control section instructs said reception section to receive the e-mail when said sound is switched from invalid to valid.

11. The image communication apparatus according to claim 10, wherein said control section instructs said reception section not to receive the e-mail during the time said sound function is invalid, and after the time said sound function is switched to valid, instructs said reception section to receive the e-mail at predetermined intervals.

12. The image communication apparatus according to claim 9, wherein said control section controls reception of the e-mail in said reception section, while keeping said predetermined intervals even when said sound function is switched.

13. The image communication apparatus according to claim 12, wherein said control section instructs said reception section to omit the reception of the e-mail during the time said sound function is invalid.

14. The image communication apparatus according to claim 9, wherein said control section judges whether or not said e-mail to be received exists before instructing said reception section to receive said e-mail, and when said e-mail exists, instructs said reception section to receive said e-mail.

15. The image communication apparatus according to claim 14, wherein said control section judges whether or not said e-mail to be received exists by inquiring whether said e-mail is received in a mail server of said mail server through said communication channel.

16. A telephone apparatus with an automatic telephone answering function, comprising:
   a reception section that is configured to receive an e-mail through a communication channel; and
   a control section that is configured to instruct said reception section to receive the e-mail at predetermined intervals, while judging whether or not said automatic answering telephone function is valid before instructing to receive the e-mail, and not to instruct to receive the e-mail when said answering telephone function is valid.

17. The telephone apparatus according to claim 16, wherein said control section instructs said reception section to receive the e-mail when said automatic telephone answering function is switched from valid to invalid.

18. A facsimile apparatus, with an automatic telephone answering function, performing transmission and reception of an image through a communication channel, comprising:
   a scanning section that is configured to receive an image or an e-mail through said communication channel;

a recording section that is configured to record the image received in said reception section; and a control section that is configured to instruct said reception section to receive the e-mail at predetermined intervals, while judging whether or not said automatic answering telephone function is valid before instructing to receive the e-mail, and not to instruct to receive the e-mail when said answering telephone function is valid.

19. The facsimile apparatus according to claim 18, wherein said control section instructs said reception section to receive the e-mail when said automatic telephone answering function is switched from valid to invalid.

20. A method of receiving an e-mail in a facsimile apparatus, with an automatic telephone answering function, performing transmission and reception of an image through a communication channel, comprising:

judging whether or not said automatic answering telephone function is valid or invalid before receiving said e-mail at predetermined intervals; and receiving said e-mail when said automatic telephone answering function is invalid, while not receiving said e-mail when said automatic telephone answering function is valid.

* * * * *